(12) United States Patent
Kotecha et al.

(10) Patent No.: US 8,644,411 B2
(45) Date of Patent: *Feb. 4, 2014

(54) GENERALIZED REFERENCE SIGNALING SCHEME FOR MULTI-USER MULTIPLE INPUT, MULTIPLE OUTPUT (MU-MIMO) USING ARBITRARILY PRECODED REFERENCE SIGNALS

(75) Inventors: Jayesh H. Kotecha, Austin, TX (US); Jayakrishnan C. Mundarath, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,805

(22) Filed: Jun. 11, 2012

(65) Prior Publication Data

US 2012/0314654 A1    Dec. 13, 2012

Related U.S. Application Data

(63) Continuation of application No. 12/897,417, filed on Oct. 4, 2010, now Pat. No. 8,199,846, which is a continuation of application No. 11/687,508, filed on Mar. 16, 2007, now Pat. No. 7,809,074.

(51) Int. Cl.
*H04B 7/02*    (2006.01)

(52) U.S. Cl.
USPC .............. 375/267; 375/260; 375/259; 455/59

(58) Field of Classification Search
USPC .............................. 375/267, 260, 259; 455/59
See application file for complete search history.

(56) References Cited

PUBLICATIONS

Freescale, "Scheme for MU-MIMO in DL EUTRA", R1-070223, Jan. 2007, 3GPP TGS RAN WG1 Meeting #47bis, Sorrento, Italy.*
Philips, "Comparison between MU-MIMO codebook-based channel reporting techniques for LTE downlink." R1-062483, Oct. 2006. 3GPP TGS RAN WG1 Meeting #46bis, Seoul.*
Philips, "System-level simulation results for channel vector quantisation feedback for MU-MIMO." R1-063028, Nov 2006. 3GPP TGS RAN WG1 Meeting #47, Riga.*
Philips, "Comparison of MU-MIMO Feedback Schemes with Multiple UW Receive Antennas," 3GG TSG RAN WG1 Meeting #47bis, Sorrento, Italy, Jan. 15-19, 2007, Tdoc R1-070346.*
Alcatel, "Link-level results for multiuser eigenmode transmission with limited feedback"; R1-070318 3GG TSG RAN WG1 Meeting #47bis, Sorrento, Italy, Jan. 15-19, 2007, Tdoc R1-070318.*

* cited by examiner

*Primary Examiner* — Juan A Torres
(74) *Attorney, Agent, or Firm* — Paradigm IP Law, PC; Ross L. Franks

(57) ABSTRACT

A multi-user MIMO downlink beamforming system (200) is provided to enable transmit beamforming vectors to be efficiently provided to a subset of user equipment devices (201.$i$), where spatial separation or zero-forcing transmit beamformers ($w_i$) are computed at the base station (210) and used to generate precoded reference signals (216). The precoded reference signals (216) are fed forward to the user equipment devices (201.$i$) which apply one or more hypothesis tests (207.$i$, 208.$i$) to the precoded reference signals to extract the precoding matrix (W), including the specific transmit beamforming vector ($w_{UE}$) designed for the user equipment, and this extracted information is used to generate receive beamformers ($v_i$).

25 Claims, 5 Drawing Sheets

GENERALIZED REFERENCE SIGNALING SCHEME FOR MULTI-USER MULTIPLE INPUT, MULTIPLE OUTPUT (MU-MIMO) USING ARBITRARILY PRECODED REFERENCE SIGNALS

PRIORITY AND CROSS-REFERENCE TO RELATED APPLICATIONS

This application is a continuation of and claims priority to co-owned and co-pending U.S. patent application Ser. No. 12/897,417, entitled "GENERALIZED REFERENCE SIGNALING SCHEME FOR MULTI-USER, MULTIPLE INPUT, MULTIPLE OUTPUT (MU-MIMO) USING ARBITRARILY PRECODED REFERENCE SIGNALS", filed on Oct. 4, 2010 and issuing as U.S. Pat. No. 8,199,846, which is a continuation of U.S. patent application Ser. No. 11/687,508, entitled "GENERALIZED REFERENCE SIGNALING SCHEME FOR MULTI-USER MULTIPLE INPUT, MULTIPLE OUTPUT (MU-MIMO) USING ARBITRARILY PRECODED REFERENCE SIGNALS", filed Mar. 16, 2007 (now U.S. Pat. No. 7,809,074), each of the foregoing being incorporated herein by reference in its entirety.

BACKGROUND OF THE INVENTION

1. Field of the Invention

The present invention is directed in general to the field of information processing. In one aspect, the present invention relates to a system and method for communicating reference signal information in wireless MIMO communication systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method where a transmitter having multiple transmit antennas wirelessly transmits signals to a plurality of receivers, each of which has multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

FIG. 1 depicts a wireless MIMO communication system 100 that employs SDMA. In MIMO systems, transmitters and receivers are both equipped with multiple antennas. The wireless communication system 100 includes one or more transmitters 101 (e.g., base stations) and one or more receiver stations 102.1-102.$m$ (e.g., subscriber stations), where "m" is an integer representing the number of receiver stations in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In an SDMA-MIMO wireless communication system, each base station 101 and subscriber station 102.$i$ includes an array of antennas for transmitting and receiving signals. In SDMA, different subscriber stations share the same time-frequency channel and the separation between them occurs in the spatial dimension. During transmission, the antenna array forms a beam or multiple beams by applying a set of transmit beam forming weights to signals applied to each antenna in the antenna array. A different set of transmit beam forming weights is applied by the base station to each communication with each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink.

As depicted more specifically in FIG. 1, the MIMO system base station 101 uses beamforming to transmit a single data stream (e.g., $s_i$) through multiple antennas, and the receiver combines the received signal from the multiple receive antennas to reconstruct the transmitted data. This is accomplished with "beamforming" weights whereby a signal $s_i$ is processed in a signal processing unit 103.$i$ for transmission by applying a weight vector $w_i$ to the signal $s_i$ and transmitting the result $x_j$ over an array of antennas. The weighting vector $w_i$ is used to direct the signal with the objective of enhancing the signal quality or performance metric, like signal-to-interference-and-noise ratio (SINR) of the received signal. At the receiver, the received signals detected by the array of antennas are processed using a combining vector $v_i$. In particular, the base station 101 has an array of N antennas 105, where N is an integer greater than or equal to m. The base station prepares a transmission signal, represented by the vector $x_i$, for each signal $s_i$, where $i \in \{1, 2, \ldots, m\}$. (Note: lower case bold variables indicate vectors and upper case BOLD variables indicate matrices). The transmission signal vector $x_i$ is determined in accordance with Equation [1]:

$$x_i = w_i \cdot s_i \qquad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 105. In addition, the term "$s_i$" is the data to be transmitted to the $i^{th}$ receiver. Each of the coefficients of weight vector $w_i$ may be a complex weight. Unless otherwise indicated, transmission beamforming vectors are referred to as "weight vectors," and reception vectors are referred to as "combining vectors," though in systems having reciprocal channels (such as TDD systems), a combining vector v at a receiver/subscriber station can be used as both a combining vector (when receiving signals from a transmitter/base station) and a weighting vector (when transmitting to a transmitter/base station).

The transmission signal vector $x_i$ is transmitted via a channel represented by a channel matrix $H_i$. The channel matrix $H_i$ represents a channel gain between the transmitter antenna array 105 and the receive antenna array 104.$i$ at the $i^{th}$ subscriber station 102.$i$. Thus, the channel matrix $H_i$ can be represented by a $N \times k_i$ matrix of complex coefficients, where N is the number of antennas at the base station antenna array 105 and $k_i$ is the number of antennas in the $i^{th}$ subscriber station antenna array 104.$i$. The value of $k_i$ can be unique for each subscriber station. As will be appreciated, the channel matrix $H_i$ can instead be represented by a $k_i \times N$ matrix of complex coefficients, in which case the matrix manipulation algorithms are adjusted accordingly so that, for example, the right singular vector calculation on a $N \times k_i$ channel matrix becomes a left singular vector calculation on a $k_i \times N$ channel matrix. The coefficients of the channel matrix $H_i$ depend, at least in part, on the transmission characteristics of the medium, such as air, through which a signal is transmitted. A variety of methods may be used to determine the channel matrix $H_i$ coefficients, such as transmitting a known pilot signal to a receiver so that the receiver, knowing the pilot signal, can estimate the coefficients of the channel matrix $H_i$ using well-known pilot estimation techniques. Alternatively, the actual channel matrix $H_i$ is known to the receiver and may also be known to the transmitter.

At the subscriber station 102.$i$, the transmitted signals are received on the $k_i$ receive antennas. For example, the transmission signal vector $x_1$ is transmitted via a channel represented by a channel matrix $H_1$, and is received at the receiver 102.1 as a receive signal vector $y_1 = H_1^H x_1 + n_1$ (where n represents noise and any co-channel interference caused by other subscriber stations). More specifically, the received signals for the subscriber station 102.$i$ are represented by a $k_i \times 1$ received signal vector $y_i$ in accordance with Equation [2]:

$$y_i = s_i^* H_i^H w_i + \left( \sum_{n=1}^{m} s_n^* H_i^H w_n - s_i^* H_i^H w_i \right) \quad [2]$$

where "$s_i$" is the data to be transmitted to the $i^{th}$ subscriber station 102.$i$, "$s_n$" is the data transmitted to the $n^{th}$ subscriber station 102.$n$, the * superscript denotes the complex conjugation operator, "$H_i^H$" represents the complex conjugate transpose of the channel matrix correlating the base station 101 and $i^{th}$ subscriber station 102.$i$, $w_i$ is the $i^{th}$ transmit weight vector, and $w_n$ is the $n^{th}$ transmit weight vector. The superscript "H" is used herein as a hermitian operator to represent a complex conjugate transpose operator. The $j^{th}$ element of the received signal vector $y_i$ represents the signal received on the $j^{th}$ antenna of subscriber station 102.$i$, $j \in \{1, 2, \ldots, k_i\}$. The first term on the right hand side of Equation [2] is the desired receive signal while the summation terms less the desired receive signal represent co-channel interference. Finally, to obtain a data signal, which is an estimate of the transmitted data $s_i$, a signal processing unit 108.$i$ at the subscriber station 102.$i$ combines the signals received on the k antennas using a combining vector $v_i$ in accordance with Equation [3]:

$$z_i = \hat{s}_i = y_i^H v_i \quad [3]$$

While the benefits of MIMO are realizable when the receiver 102.$i$ alone knows the communication channel, these benefits are further enhanced in "closed-loop" MIMO systems when the transmitter 101 has some level of knowledge concerning the channel response between each transmitter antenna element and each receive antenna element of a receiver 102.$i$. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 105. For example, precoding techniques can be used at the base station 101 to provide a multi-mode beamformer function to optimally match the input signal on one side to the channel on the other side so that multiple users or subscriber stations can be simultaneously scheduled on the same time-frequency resource block (RB) by separating them in the spatial dimension. This is referred to as a space division multiple access (SDMA) system or as a multi-user (MU)-MIMO system. Additional examples of precoding include using a channel quality indicator (CQI) value measured at a receiver 102.$i$ to perform adaptive modulation and coding (AMC) on the transmit signal before transmission to the receiver 102.$i$.

While full broadband channel knowledge may be obtained at the transmitter 101 by using uplink sounding techniques (e.g., with Time Division Duplexing (TDD) systems), most precoded MIMO systems (e.g., with TDD or Frequency Division Duplexing (FDD) systems) use channel feedback techniques to measure channel infoliation at the receiver 102.$i$ and then feed back the measured channel information to the transmitter 101. However, it is difficult to accurately measure the channel information or associated channel characteristics (such as SINR or channel quality information (CQI)) for a particular receiver when the communication status of other receivers in the vicinity is not known. In an SDMA system, the incomplete knowledge at a receiver results from the fact that signal information being sent to other receivers can appear as interference or noise at the intended receiver 102.$i$, though the receiver can not be expected to have this knowledge when the channel characteristics are being measured. To address the fact that each receiver station has incomplete knowledge about the transmission conditions when the channel information is being measured, the transmitter station 101 can feed forward the precoding matrix information $W=[w_1, w_2, \ldots w_m]$ that is computed based on the channel feedback information from the receiver stations 102.1-102.$m$. However, the signaling overhead associated with feeding forward the precoding matrix information to each receiver station can be quite large, especially when the precoding matrix information can be arbitrarily computed as a function of the channel vector feedback information from each receiver station. Moreover, the limited feed forward resources require that any practical system be designed to have a low feed forward rate, while existing systems for feeding forward precoding matrix information can have unacceptably high feed forward data rates. Dedicated reference signals can be used whereby one or more reference signals are weighted and transmitted using the same transmit beamforming vectors as the beamformed data signals. However, dedicated reference signals typically require a significant signaling overhead for notifying each receiver of its dedicated reference signal, such as control signals to indicate the number of precoded streams and the desired reference signal for each receiver. Even if the signaling overhead is included as part of the usual scheduling overhead, it still consumes valuable overhead.

Accordingly, there is a need for an improved system and methodology for signal processing and control signaling in a MIMO-SDMA system. There is also a need for a multi-user MIMO system which efficiently conveys precoding matrix information to a particular receiver without requiring advance knowledge of the other receivers or the base station scheduling algorithm. In addition, there is a need for a family of signal processing algorithms for generating transmit and receive array vectors for MIMO-SDMA which overcomes limitations in the feed forward data rate and other problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
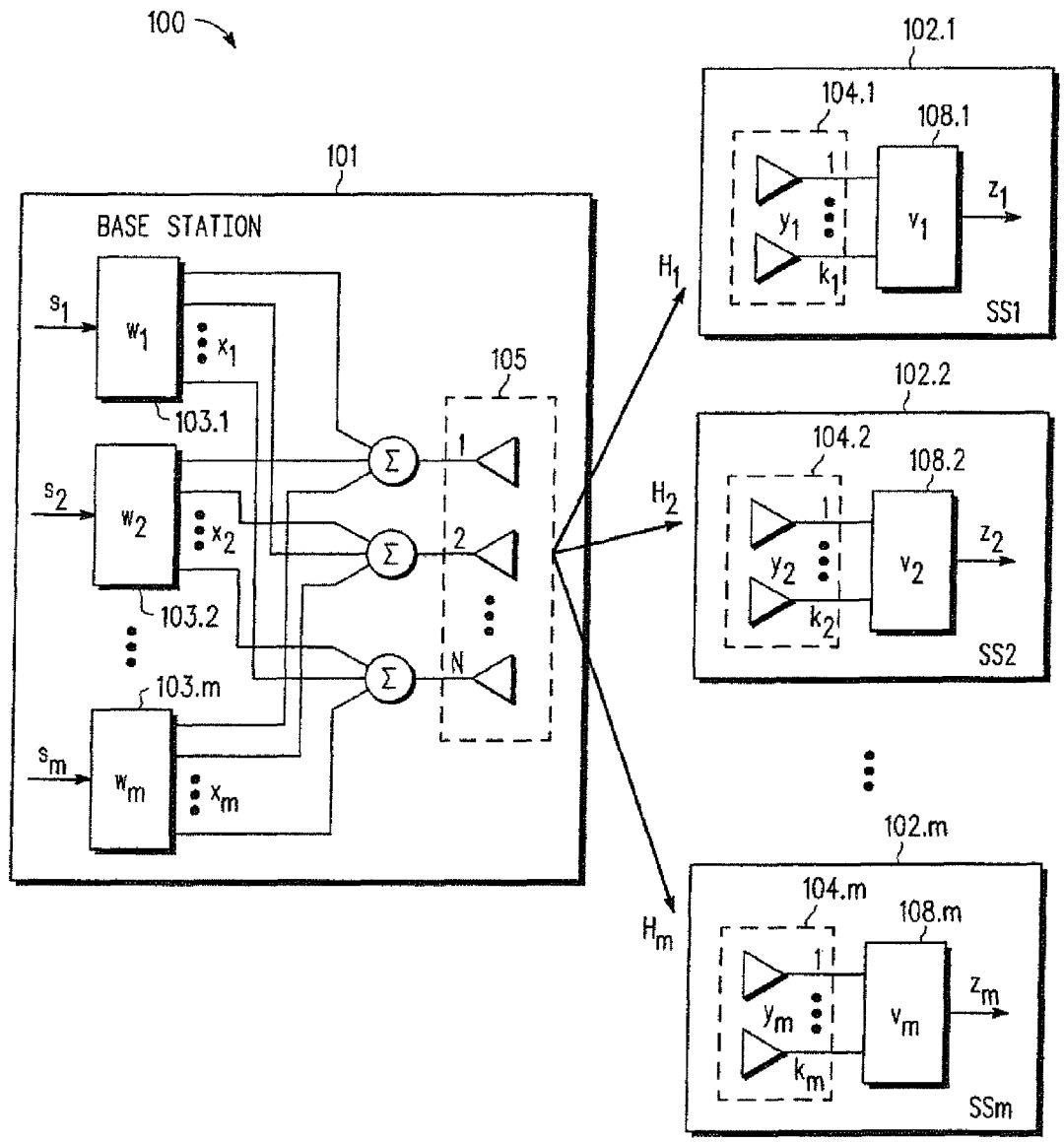
FIG. 1 (labeled prior art) depicts a wireless communication system.

A reference signal feed forward system and methodology are described for use in efficiently providing precoding matrix infatuation to receivers in a wireless, multi-user, multi-input, multiple output (MIMO) SDMA system. Once a transmitter (e.g., base station) generates precoding vectors using an arbitrary multi-user MIMO beamforming algorithm, precoded reference signals are fed forward to some or all of the receivers (e.g., user equipment devices) to provide knowledge of the precoding vectors to the receiver(s), Dedicated precoded reference signals are used whereby one or more reference signals are weighted and transmitted using the same transmit beamforming vectors as the beamformed data signals. However, dedicated reference signals typically require a significant signaling overhead for notifying each receiver of its dedicated reference signal, such as control signals to indicate the number of precoded streams and the desired reference signal for each receiver. Even if the signaling overhead is included as part of the usual scheduling overhead, it still consumes valuable overhead. At the receiver, the precoded reference signals are processed with one or more hypothesis tests to extract the beamforming vectors and/or matrix information which enables receive beamformers to be designed for the receiver, such as by using, for example, a minimum mean square error (MMSE) criterion. In selected embodiments, a first test is performed at the receiver to process the precoded reference signals to detect which of the precoded reference signals was intended for the receiver in question without the need of feed forwarding explicit information to that effect. With a second test, the receiver processes the precoded reference signals to identify all of the precoding vectors $W=[w_1, w_2, \ldots w_m]$ used by the transmitter, thereby facilitating MMSE decoding at the receiver. In this way, a generalized reference signaling scheme is enabled for a MU-MIMO system using arbitrarily precoded reference signals.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
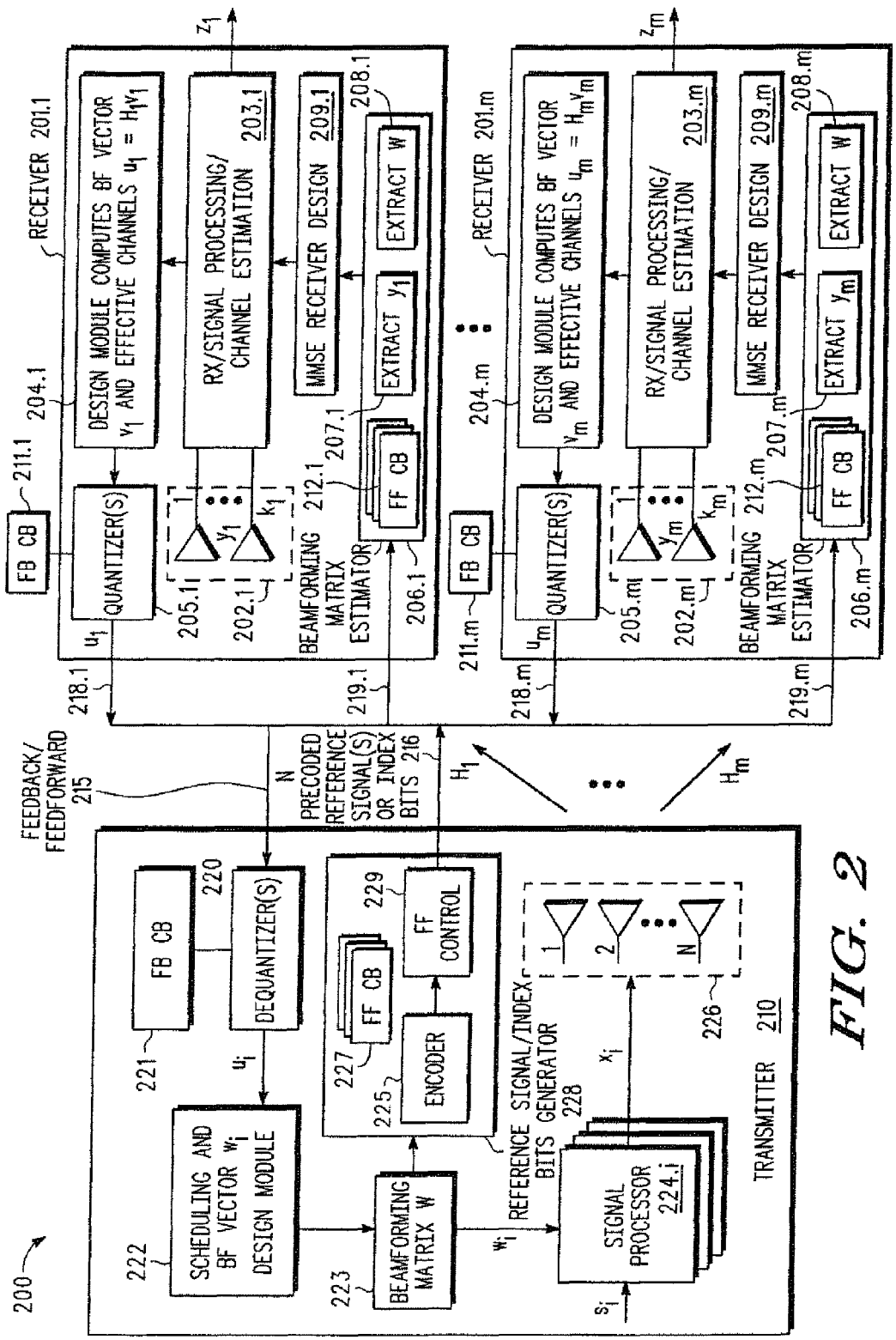
FIG. 2 depicts a wireless communication system in which precoded reference signals are fed forward to convey downlink transmit beamforming matrix information to each receiver station.

FIG. 2 depicts a wireless communication system 200 in which N precoded reference signal(s) 216 are fed forward from a transmitter 210 (e.g., a base station) to one or more receivers 201.1-$m$ (e.g., subscriber stations) to convey downlink transmit beamforming matrix information to each receiver station 201.$i$. The transmitter 210 includes an array 226 of antennas for communicating with the receivers 201.$i$ through 201.$m$, each of which includes an array 202.$i$ of receive antennas for communicating with the transmitter 210. In operation, a data signal $s_i$ presented at the transmitter 210 for transmission to the receiver 201.$i$ is transformed by the signal processor 224.$i$ into a transmission signal represented by the vector $x_i$. The signals transmitted from the transmit antenna 226 propagate through a matrix channel $H_i$ and are received by the receive antennas 202.$i$ where they are represented by the vector $y_i$. For a MIMO channel from the transmitter 210 to the $i^{th}$ receiver 201.$i$, the channel is denoted by $H_i$, $i \in \{1, 2, \ldots, m\}$. The channel matrix $H_i$ may be represented as an N×$k_i$ matrix of complex entries representing the complex coefficients of the transmission channel between each transmit-receive antenna pair, where N represents the number of transmit antennas in the transmit antenna array 226, and $k_i$ represents the number of antennas of the $i^{th}$ receiver 201.$i$ (or vice versa). At the receiver 201.$i$, the signal processing unit 203.$i$ processes the $y_i$ signals received on the k antennas to obtain a data signal, $z_i$, which is an estimate of the transmitted data signal The processing of the received $y_i$ signals may include combining the $y_i$ signals with appropriate combining vector information $v_i$ generated by the minimum mean square error (MMSE) receiver design module 209.$i$. As described herein, the receiver 201.$i$ uses the precoded reference signals to extract the transmit beamforming vector matrix information W generated at the transmitter 210, and then uses the extracted transmit beamforming vector matrix information W to compute or choose the combining vector information $v_i$ using any desired receive beamformer design method, for example the MMSE method.

Transmit beamforming or precoding at the transmitter may be implemented by having each receiver 201.$i$ determine its MIMO channel matrix $H_i$—which specifies the transmission channel between a transmitter and an receiver—in the channel estimation signal processing unit 203.$i$. For example, in a MIMO implementation, each receiver 201.1-$m$ determines its MIMO channel matrix $H_i$ by using pilot estimation or sounding techniques to determine or estimate the coefficients of the channel matrix $H_i$. Each receiver 201.$i$ uses the estimated MIMO channel matrix or other channel-related information (which can be channel coefficients or channel statistics or their functions, such as a precoder, a beamforming vector or a modulation order) to generate or compute an initial receive or combining beamforming vector $v_i$. For example, a receive beamforming design module 204.$i$ at each receiver 201.$i$ computes an initial or optimal receive beamforming vector $v_{opt\ i}$ that represents an optimal blind receive beamforming vector, such as by maximizing a predetermined receive signal-to-interference-and-noise (SINR) metric. Alternatively, the receive beamforming vector $v_{opt\ i}$ for the receiver 201.$i$ is derived from or is generated to be substantially equivalent to a right singular vector corresponding to the maximum singular value of the channel matrix between the transmitter 210 and the receiver 201.$i$ (e.g., $v_{opt\ i} = RSV_{max}(H_i)$). However computed, the initial beamforming vector $v_{opt\ i}$ is used to generate effective channel information in the design module 204.$i$, such as by computing or selecting a vector codeword $u_i$ representing the vector quantity $H\ v_{opt\ i}$. In selected embodiments, the vector codeword $u_i$ represents the preferred precoding vector for the receiver 201.$i$, where the preferred precoding vector are the columns of on or more unitary matrices, which may be referred to as basis vectors. As will be appreciated, each receiver 201.$i$ may compute and feed back other information in addition to, or in place of effective channel information $u_i$, such as channel quality information (CQI) or any other information that may be used at the transmitter to generate precoding matrix W information.

Rather than feeding back the entire scalar, vector or matrix representation of the effective channel information (such as the selected codeword $u_i$ or the full CQI values which would require a large number of bits), the receiver 201.$i$ may use a quantizer 205.$i$ to quantize the effective channel information $u = H_i\ v_{opt\ i}$ that is generated by the design module 204.$i$ and that will be used by the transmitter 210 in controlling signal transmission to the receiver 201.$i$. For example, in quantizing the effective channel information u, a feedback codebook 211.$i$ at the receiver 201.$i$ may be used to store an indexed set of possible codewords u so that the codewords u generated by the vector design module 204.$i$ can be used by the quantizer 205.$i$ to retrieve a corresponding index from the feedback codebook 211.$i$ and provide the retrieved index over a feedback channel 218.$i$ (e.g., a low rate feedback channel 215) to the transmitter 210.

Once the effective channel information from a receiver 201.$i$—such as the selected codeword $u_i$ and CQI value(s)— are indexed and fed back to the transmitter 210 over the low rate feedback channel 215, the transmitter 210 decodes or dequantizes the indexed feedback information using a codebook-based dequantizer 220 which accesses a feedback codebook 221 to obtain the effective channel information (e.g., $u_i$) for the receiver 201.$i$. As will be appreciated, the transmitter feedback codebook 221 is the same as the feedback codebook 211.$i$ used at the receiver 201.$i$. The retrieved effective channel information is provided to the design module 222 which computes scheduling information and designs the transmit bearnforming vectors $w_i$ for each receiver 201.$i$ When the selected codeword $u_i$ computed by the receiver 201.$i$ represents the receiver's effective channel, $u_i = H_i v_i/\|H_i v_i\|$, the design module 222 at the transmitter 210 may use a spatial separation algorithm such as zero-forcing beamforming (ZFBF) (or variants thereof such as regularized zero-forcing beamforming) to design each transmit beamforming vector $w_i = \tilde{w}_i/\|\tilde{w}_i\|$ such that $$\tilde{w}_i^H u_j \geq \gamma_1, \text{ if } i=j$$

$$\tilde{w}_i^H u_j \leq \gamma_2, \text{ if } i \neq j \quad [4]$$

$\gamma_1 > 0$ and $\gamma_2$ are constants such that $\gamma_2 \ll \gamma_1$. Usually, $\gamma_2 \approx 0$. Equation 4 is a typical spatial separation constraints equation that ensures that the desired signal component is accentuated and the undesirable interference terms are minimized at the receiver. A specific embodiment of the above is the zero-forcing beamforming equation where $\gamma_1 = 1$ and $\gamma_2 = 0$.

One approximate solution to the zero-forcing version of Equation 4 with $\gamma_1 = 1$ and $\gamma_2 = 0$ is given by:

$$\tilde{W} = X(X^H X + \alpha I)^{-1} \quad [5]$$

where $X = [u_1 u_2 \ldots u_k]$, I is an identity matrix and a is a scalar constant that provides a smoothing function to account for imperfections in the knowledge of the effective channel due to quantization or otherwise. The solution in Equation (5) is exact with respect to Equation (4) if $\alpha = 0$. This ensures that interference to a user due to the other users' transmissions is close to zero. In selected embodiments, the designed precoding vectors $w_i$ are computed as a function of the preferred precoding vectors requested by the receivers. However, while zero-forcing beamforming can be used to generate a beamforming matrix $W = [w_1, w_2, \ldots w_m]$ 223, it will be appreciated that the design module 222 can use any (arbitrary) multi-user MIMO algorithm to generate the beamforming matrix information W 223. In accordance with various embodiments, the designed transmit beamforming vectors are selected from a defined set of candidate transmit beamforming vectors which are also known to the receivers 201.$i$, even though any given receiver has no advance knowledge about which transmit beamforming vector is intended for which receiver.

Once the design module 222 designs the transmit beamforming vectors wi for each receiver 201.$i$, the design module 222 provides the designed transmit beamforming vectors wi contained in the precoding information 223 to one or more signal processors 224.$i$ where they are applied to precode the data input signal si in the course of generating the transmit signal xi which is transmitted over the transmit antenna array 226 to the receiver(s) 201.$i$.

Before using the precoding information to control signal transmission to the receivers 201.$i$, the transmit beamforming vectors $w_i$ may be assembled in the form of a beamforming matrix $W = [w_1, w_2, \ldots w_m]$ and conveyed to the receivers by either (a) using reference signals carrying precoded pilot symbols, or (b) sending bit(s) on the control channel indicative of the transmission matrix W.

When conveyed by using one or more reference signals, the beamforming matrix W is used by the encoder module 225 in the reference signal generator 228 to generate up to N precoded reference signal(s) 216 that may be fed forward to the receivers 201.$i$. In various embodiments, the precoded reference signals may refer to one or more (up to N) precoded reference signals, depending on how the transmit beamforming matrix is encoded and received. In this way, the transmitter 210 transmits one or more precoded reference signals corresponding to either the transmit beamforming matrix or to one or more of of its computed transmit beamforming vectors. For example, if the transmitter antenna array 226 has four transmit antennas, up to four receivers can be simultaneously supported when zero-forcing beamforming is used. In this case, up to four reference signals (e.g., $RS_1, RS_2, RS_3$, and $RS_4$) are precoded with precoding vectors (e.g., $w_1, w_2$, $w_3$, and $w_4$), thereby generating up to four precoded reference signals (e.g., $RS_1 w_1$, $RS_2 w_2$, $RS_3 w_3$, and $RS_4 w_4$).

When conveyed by using bit level signaling, the beamforming matrix W is fed forward to each receiver 201.*i* by sending bits 216 on the control channel that are indicative of the transmission matrix used. This approach assumes that the transmission matrix W is chosen from a set of M possible candidate matrices so that each candidate matrix may be uniquely identified by a minimum of $\log_2(M)$ bits. To implement bit level signaling, a feed forward codebook 227 may be used to store each of the candidate matrices with their corresponding bit index values. The bit index that is representative of the transmission matrix W may be transmitted by the transmitter to each receiving device. And since the receiving device has information of all possible candidate transmission matrices beforehand (e.g., stored in a feed forward codebook 212.*i*), the receiving device can use the bit index to retrieve the appropriate transmission matrix W by a single lookup, and can subsequently use this transmission matrix W to design its receive beamformer. In one embodiment, a bit sequence uniquely identifying the transmission matrix W above is transmitted and the receiver retrieves the transmission matrix W by employing a lookup into its database of candidate transmission matrices. In an alternative embodiment, the transmitter and the receiver can share beforehand a codebook of transmission vectors, and the final transmission matrix W used would be a combination of at most N distinct transmission vectors. In such a case, the transmitter may signal the transmission matrix W by sending N K-bit sequences, where each sequence is uniquely representative of the transmission vectors comprising the transmission matrix W, where K is the minimum number of bits required to uniquely represent each candidate transmission vector. In yet another alternative embodiment, the transmitter may sent N bit sequences, each of which uniquely identifies the codewords that were fed back to the transmitter by each multiplexed user, where K is the minimum number of bits required to uniquely represent each candidate transmission vector. In this case, the transmitter uses a pre-determined algorithm, which is known to all receiving units, to map the codewords to the final transmission matrix W used. The receiver first retrieves the codewords of all multiplexed users using the bit sequences fed forward to it by the transmitter, and then constructs the transmission matrix W using the known algorithm. The result of the execution of either of the embodiments above is the knowledge of the transmission matrix W at the receiver. Once the transmission matrix W is known, the receiving unit executes a second test to determine which of the transmission vectors contained in W is meant for it. In one embodiment, this test is done by computing $\max_{j=1,2,\ldots,N} |w_j^H H v_{opt}|^2$, where $v_{opt}$ is the optimal blind receive beamformer, H is the MIMO channel matrix and $w_j$ is the jth column of W.

The precoded reference signals ($RS_1 w_1$, $RS_2 w_2$, . . . $RS_M W_M$) 216 may be fed forward by the feed forward control field generator 229 over a feed forward channel 219.*i* (e.g., a low rate feed forward channel 215) to the receivers 201.*i*. Once the precoded reference signal information 216 is fed forward to the receiver 201.*i*, the receiver 201.*i* decodes the information and provides the precoded reference signal information to the beamforming matrix estimation module 206.*i*. For example, a feed forward control decoder (not shown) is used to decode the feed forward signal to obtain the precoded reference signal information generated by the transmitter 210.

However recovered, the retrieved precoded reference signal information is processed by the beamforming matrix estimation module 206.*i* to enable MMSE receive operations without having prior knowledge about which specific precoding vector $w_{UE}$ was intended for the receiver or which beamforming algorithm was used by the transmitter 210 to generate the precoding vectors $w_1, w_2, \ldots w_m$. In this way, the transmitter 210 has complete flexibility in designing its beamforming matrix and precoding algorithms. To provide this flexibility, the beamforming matrix estimator 206.*i* processes the received precoded reference signals to detect which exact precoding vectors $w_1, w_2, \ldots w_m$ were used by the transmitter 210, and to detect which of the precoding vectors is intended for the receiver in question.

To detect this information from the precoded reference signals, the beamforming matrix estimator 206.*i* performs hypothesis testing on the received precoded reference signals. With a first hypothesis test, the extraction module 207.*i* determines which reference signal, out of the 'm' reference signals transmitted, is encoded using the transmission vector intended for the receiver by effectively projecting the received precoded reference signals to its optimal blind receive beamformer. In effect, the comparison function uses the received precoded reference signals to determine which reference signal is intended for the receiver. In an example implementation, the detection function applies the following test:

$$\max_{j=1,2,3,4} |v_{opt}^H y_j|^2, \quad [6]$$

where $v_{opt}$ is the optimal blind receive beamformer initially designed by the receiver design module 204.*i*, $y_j$ are the received N precoded reference signals (e.g., $y_j = RS_i w_i$), and H is the channel matrix to the receiver in question. For a given precoded reference signal y, the desired reference signal chosen is the one that maximizes the test defined in Equation [6]. In effect, this test provides a measure of how "aligned" each precoding vector is with respect to the users effective channels. As a result, the precoded reference signals can be fed forward to the receivers without also feeding forward explicit information to identify which precoding vector was intended for the receiver.

In addition to detecting the intended reference signal, the beamforming matrix estimator 206.*i* may also perform additional hypothesis testing on the received precoded reference signals to extract the precoding matrix W used by the transmitter to facilitate MMSE decoding at the receiver. To this end, the extraction module 208.*i* applies a second hypothesis test to extract from a predetermined set the exact precoding vector used to generate each precoding reference signal, thereby obtaining information of all precoded vectors generated by the transmitter. In effect, the extraction function tests each precoded reference signal to identify which precoding vector from a predetermined set of precoding vectors was used to generate the precoded reference signal. In an example implementation, the comparison function applies the following test:

$$\min_i \|y - H^H w_i\|^2, \quad [7]$$

where y is the received precoded reference signal (e.g., $y = RS_1 w_1$), H is the channel matrix to the receiver in question, and $w_i$ is used for each of the predetermined set of precoding vectors (e.g., $w_1, w_2, \ldots w_m$) stored at the receiver. For each precoded reference signal y, the transmit beamformer $w_i$ is chosen which minimizes the test defined in Equation [7]. In effect, this test provides a distance measure that is used to identify which precoding vector (e.g., $w_1, w_2, \ldots w_m$) is the beamforming vector w used to generate the precoded reference signal. Once each of the precoded reference signals are tested, the complete set of precoding vectors is identified, and as a result, the transmission matrix W is identified.

Upon extracting the complete set of precoding vectors (which may be represented as a precoding matrix W), the beamforming matrix estimator provides this information to the MMSE receiver design module 209.$i$ which computes the adjusted combining vector $v_i$ for the receiver 201.$i$. The adjusted combining vector $v_1$ is used by the receiver signal processing unit 203.$i$ to process the $y_i$ signals received on the k antennas to obtain a data signal, $z_i$ by combining the $y_i$ signals with the adjusted combining vector information $v_i$.

In an alternative embodiment, the transmission vector to receiver i, $w_i$ may be chosen by the base station such that it can potentially be any vector in the N dimensional complex space—in such a case the test in Equation [7] cannot be applied since the set of possible precoding vectors is unknown at the receiver. Under such scenarios, the following procedure is used to design the receive beamformer. Let $y_j(t)$, $j=1,2,\ldots,N$ denote the $j^{th}$ reference signal at time t—suppose that k pilot time samples are sent per reference signal, that is $t=1,2,\ldots,k$ where k is greater than or equal to 1. First, using the first hypothesis test in Equation [6], the receiver 201.$i$ determines which of the N reference signals is meant for itself. For example, we can assume that a receiver 201.$i$ determines that the $y_1$ reference signal is intended for the receiver 201.$i$. Once the intended reference signal is detected, the MMSE receive beamformer is then designed using the following function:

$$v_{MMSE} = \left( \sum_{j=1}^{N} \frac{1}{k} \sum_{i=1}^{k} y_i(t) y_i(t)^H + \sigma_n^2 I \right)^{-1} \left( \frac{1}{k} \sum_{t=1}^{k} y_1(t) \right) \quad [8]$$

where I is the identity matrix and $\sigma_n^2$ is the white noise spectral density.

In another embodiment, the receive beamfouner may be designed using the following function:

$$v_{MMSE} = \beta \max eig \left[ \left( \sum_{j=1}^{N} \frac{1}{k} \sum_{i=1}^{k} y_i(t) y_i(t)^H + \sigma_n^2 I \right)^{-1} \left( \frac{1}{k} \sum_{t=1}^{k} y_1(t) y_1(t)^H \right) \right] \quad [9]$$

where "max eig (X)" denotes the dominant eigen vector of the matrix X.

Figure 3:
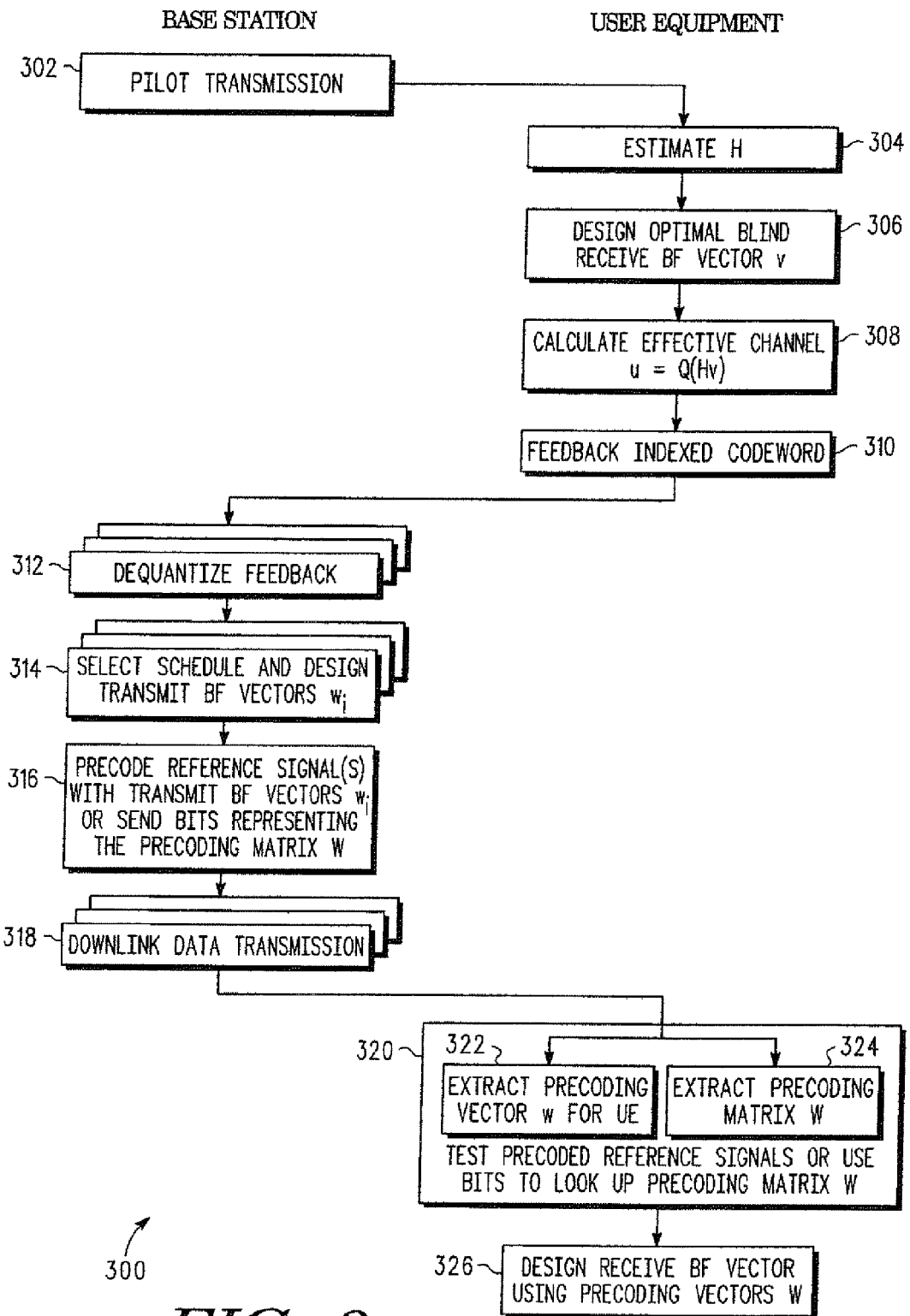
FIG. 3 depicts a first example flow for a precoding methodology for generating and feeding forward precoded reference signal information to one or more user equipment devices.

FIG. 3 depicts a generalized example flow for a precoding methodology 300 for generating and feeding forward precoded reference signal information to one or more user equipment devices. As a preliminary step, the MIMO transmission channel to a given receiver station is estimated by transmitting a pilot signal from the transmitter or base station (step 302) to the receiver or user equipment where the transmission channel is estimated (step 304). Generally, a transmission channel can be estimated by embedding a set of predetermined symbols, known as training symbols, at a base station and processing the training symbols at the user equipment to produce a set of initial channel estimates. In this example, the MIMO transmission channel being estimated at the user equipment may be characterized as a channel matrix H.

Based on the channel estimate information, the user equipment designs or computes an optimal blind receive beamforming vector v (step 306). This may be implemented by taking the singular value decomposition (SVD) of the MIMO channel matrix $H=U\Lambda V^H$, where the matrix U is a left singular matrix representing the transmit signal direction, the matrix $\Lambda$ represents the strength (or gain) of the channel and the matrix V is a right singular matrix representing the receive signal direction. The user equipment also uses the channel estimate information H to compute the effective channel vector information (step 308), such as by computing or selecting a codeword u. The receive beamforming vector v and codeword u may be computed in a variety of different ways. For example, they may be designed by selecting the values v and u=Q(Hv) that maximize a predetermined performance metric, where Q(·) is some quantization function. However determined, the codeword u is indexed and fed back to the base station at step 310. As disclosed herein, codebook-based feedback indexing techniques may be used to quantize the codeword u where the base station and user equipment share the same feedback codebook.

At the base station, the feedback information from the user equipment is dequantized (step 312) into the effective channel vector information (e.g., codeword u). The dequantized effective channel vector information is used by the base station to design the transmit beamforming vectors $w_i$ using any arbitrary multi-user MIMO beamforming algorithm (step 314), such as a regularized ZFBF algorithm. The transmit beamforming vectors $w_i$ may be represented as a beamforming matrix $W=[w_1, w_2, \ldots w_m]$. As will be appreciated, the dequantized effective channel vector information may also be used to select an appropriate modulation and coding level in systems that implement adaptive modulation and coding (AMC) mechanisms. Once the transmit beamforming vectors $w_i$ are designed, the base station uses the vectors $w_j$ to compute precoded reference signals (step 316), such as by precoding one or more reference signals with the transmit beamforming vectors $w_i$. In other embodiments, the base station uses the vectors $w_i$ to derive the bit index values corresponding to the precoding matrix W formed from the vectors $w_i$. The precoded reference signals (or the index bit values) are then fed forward to the user equipment as part of the downlink data transmission (step 318), either directly or in quantized form using a feedforward codebook.

At the user equipment, the feed forward information is decoded to obtain the precoded reference signals. As will be appreciated, the base station and user equipment device(s) share the same feed forward codebook. However decoded, the precoded reference signals are tested to obtain the information needed to perform MMSE receive operations (step 320). As described herein, the testing consists of one or more hypothesis tests which take into account the presence of Gaussian noise at the receiver. As a result, the robustness of the testing is directly a function of the additive noise present and interference present.

In testing of the precoded reference signals, a first test (step 322) is used to extract the precoding vector w from the precoded reference signals that is intended for the user equipment in question, but without requiring that explicit information be fed forward to specify the intended precoding vector. In an example implementation, the intended reference signal is identified from the precoded reference signals by selecting the precoding vector from a finite set of precoding vectors (e.g., $w_1, w_2, w_3, w_4$) which minimizes the distance measure, $$\min_{j=1,2,3,4} |v_{opt}^H H w_j|^2.$$

In a selected spatial separation algorithm embodiment, the first extraction test 322 uses properties of zero-forcing type beamforming techniques whereby, with the optimal receive beamformer $v_{opt}$ used, the other precoding vectors will be substantially orthogonal to the equivalent channel H $v_{opt}$.

The testing of the precoded reference signals may also include a second test (step 324) which extracts the precoding matrix W from the precoded reference signals by extracting from each precoded reference signal the precoding vector $w_i$ that was used to precode the precoded reference signal, again without requiring that explicit information be fed forward specifying the precoding matrix W. In an example implementation, the precoding matrix W is extracted from the precoded reference signals by selecting the precoding vector from a predetermined set of precoding vectors (e.g., $w_1, w_2, \ldots w_m$) which minimizes the distance measure, $\min_i \|y - H^H w_i\|^2$. The extracted precoding vector information is used by the user equipment to design the receive beamforming vectors $v_i$ for the user equipment (step 326), such as by using an MMSE receiver to derive the receive beamforming vectors $v_i$.

Figure 4:
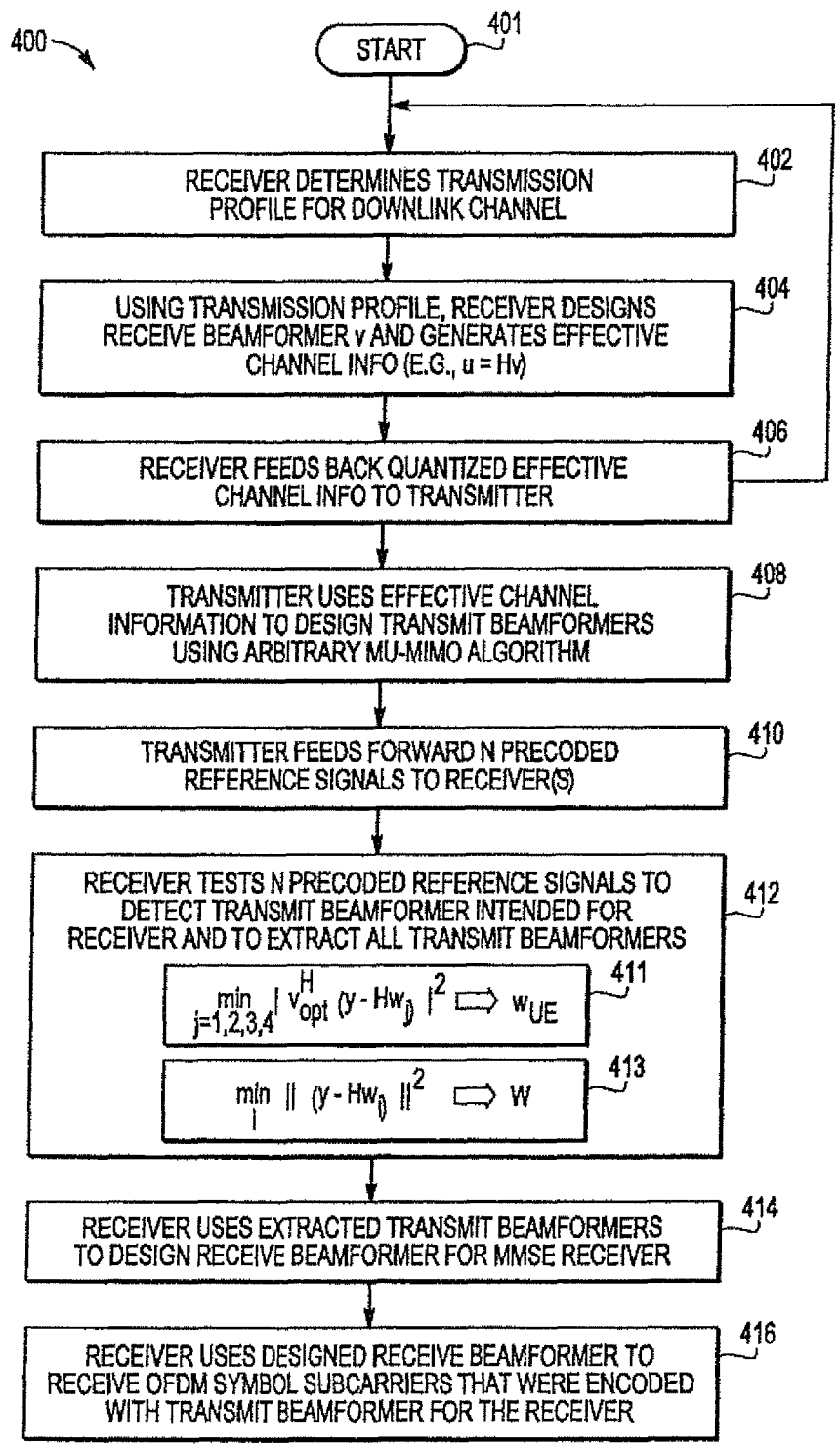
FIG. 4 depicts an example flow for a generalized reference signaling scheme for a multi-user MIMO system using arbitrarily precoded reference signals.

Selected embodiments of the present invention may also be illustrated with reference to FIG. 4, which depicts an example flow 400 for a generalized reference signaling scheme for a multi-user MIMO system using arbitrarily precoded reference signals. As depicted, the process starts (step 401) when the receiver station determines the transmission channel profile based on the estimated channel information for the MIMO transmission channel (step 402). Based on the channel profile information, the receiver station designs its optimal blind receive beamformer v and selects an optimal codeword u=Hv (step 404) to represent the effective channel to the receiver station. In an example implementation, the vectors u and v may be jointly designed by selecting candidate values from a codebook of indexed precoding parameters that maximize a predetermined performance metric for estimating the receive SINR, where the metric is defined to reduce quantization errors resulting from the codebook-based selection process. To account for the fact that the receiver station does not have prior knowledge about potential interference from other receiver stations, the receiver station uses the computed vector v as an initial receive beamforming vector. After quantizing the optimal codeword u (such as by using a codebook of indexed values to retrieve a corresponding index), the indexed effective channel information is then communicated as a feedback signal over the feedback control channel to the transmitter station (step 406) and the receiver repeats the foregoing sequence during the next design cycle (as indicated by the feedback line to step 402).

At the transmitter station, the feedback signals from the receiver stations are decoded to generate effective channel information for each receiver station, and this information is used to design transmit beamformers $w_1, w_2, \ldots w_m$ using any arbitrary multi-user MIMO technique (step 408), such as zero-forcing beamforming. The transmitter then uses each of the design transmit beamformers to precode one or more reference signals (e.g., $RS_1, RS_2$, etc.), and feeds forward the resulting N precoded reference signals (e.g., $y_1 = RS_1 w_1$, $y_2 = RS_2 w_2$, etc.) to the receiver(s) (step 410), either directly or in quantized form.

Upon reception at a receiver, the N precoded reference signals are tested to detect the transmit beamformer that was intended for receiver, and to extract all transmit beamformers generated by the transmitter (step 412). With a first test (step 411), the precoding vector $W_{UE}$ intended for the user equipment receiver is detected by selecting a vector from a finite set of predetermined precoding vectors that maximizes the objective function $$\max_{j=1,2,\ldots,N} |v_{opt}^H y_j|^2,$$

where $v_{opt}$ is the optimal blind receive beamformer initially designed by the receiver, $y_j$ is the $j^{th}$ received precoded reference signal (e.g., $y_j = RS_j w_j$), H is the channel matrix to the receiver in question. With a second test (step 413), the precoding vector matrix W is derived by detecting which precoding vector was used to generate each precoded reference signal by selecting a vector from a finite set of predetermined precoding vectors that minimizes a second distance function $\min_i \|y - H^H w_i\|^2$, where y is the subject precoded reference signal (e.g., $y = RS_1 w_1$), H is the channel matrix to the receiver in question, and $w_i$ is used for each of the finite set of predetermined precoding vectors (e.g., $w_1, w_2$, etc.) stored at the receiver.

Once the transmit beamformer information is extracted, the receiver uses the extracted information to design the receive beamformer $v_i$ for the MMSE receiver (step 414), and the receiver then uses the designed receive beamformer $v_i$ to receive OFDM symbol subcarriers that were encoded with transmit beamformer $w_i$ for the receiver (step 416).

The description provided thus far has been provided with reference to selected embodiments where multiple precoded reference signals are fed forward to the user equipment receivers. In these embodiments, each receiver is able to extract the transmit precoding vector information from the precoded reference signals without having received prior knowledge of the specific precoding and beamforming algorithm used by the transmitter, either by choosing from a predefined set of precoding vectors (e.g., $w_1, w_2, \ldots w_m$) that is stored at each receiver, or by estimating the precoding vectors instead of doing a hypothesis test if they are arbitrary (i.e., they do not come from a pre-defined set but instead are derived from an arbitrary continuous space). However, selected embodiments of the present invention provide for an even more efficient reference signaling scheme for multi-user MIMO systems by using structured precoded reference signals in combination with regularized zero-forcing beamforming techniques to effectively convey the transmit precoding matrix W with a minimum of a single precoded reference signal. In other words, a mechanism is disclosed by which information regarding an N×N transmission matrix (for any N) can be fed forward to each receiver by using just one precoded reference signal. As a result, complete knowledge of the beamforming matrix may be provided to each receiver, but is done in such a way that size of the feed forward information does not scale with the size of N. As will be appreciated, the reliability or robustness of this algorithm can be improved by adding more reference signals which is illustrated later on.

To illustrate the compact reference signaling scheme, reference is now made to the wireless communication system depicted in FIG. 2. As depicted, the transmitter base station 210 with multiple transmit antennas 226 communicates in a multi-user MIMO mode with multiple user equipment receivers 201.1-201.m, each of which has a multi-antenna array 202.i. The transmitter base station 210 transmits via beamforming so that the signal, denoted by $s_i$, transmitted to a given user equipment receiver 201.i provides no interference to other receivers in the system. To accomplish this, the transmitter chooses the appropriate transmit beamformers $w_i$ based on the downlink channel information $u_i$ that has been fed back by each receiver over a feed back channel 218.i. Downlink channel estimation is done at each receiver 201.i and is quantized using a known feedback codebook 211.i so that a codeword is selected from the codebook 211.i and fed back to the transmitter 210. Due to the imperfect channel knowledge at the transmitter 210, each receiver 201.i encounters interference from the transmissions to the other receivers in spite of the transmitter's effort to separate the multi-user streams.

In the single reference signal example, the vector design module 222 uses a predetermined MU-MIMO algorithm—which in one embodiment can be a regularized zero-forcing beamforming (R-ZFBF) algorithm—to obtain user separation. In one embodiment of a R-ZFBF algorithm, given a predetermined set (denoted as U) of candidate equivalent channel codewords, the 'in' receivers feed back equivalent channel vectors (denoted as $u_1, u_2, \ldots, u_m$) from this set U. Based on the 'm' equivalent channel vectors, the R-ZFBF algorithm is used to design the beamforming matrix W using (X=$u_1 u_2 \ldots u_m$), W=X[$X^H X+\alpha I]^{-1}$, where I is an identity matrix and a is a scalar constant that provides a smoothing function to regularize the imperfection in effective channel estimates due to quantization or otherwise. The columns of the actual beamforming matrix W are further normalized to be of unit norm.

With this approach, the optimal receiver/combiner at a receiver $201.i$ is an MMSE receiver which obtains knowledge of the beamforming matrix W by receiving a single precoded reference signal on the forward downlink channel prior to data transmission using the compact feed forward scheme described herein. The approach exploits the fact that the precoding matrix W corresponding to each unique combination of the possible codewords $u_i$ is unique. Since each possible precoding matrix W is unique, the codewords in each possible X can be arranged by ordered indices so that the precoded reference signal or pilot that is sent on the downlink broadcast channel uses a single predetermined column of the designed beamforming matrix W (e.g., the first column, or the second column, or the third column, etc.). When the precoded reference signal is detected, the extraction module $208.i$ in each receiver station $201.i$ determines the precoding matrix W by hypothesis testing the precoded reference signal against the predetermined column (e.g., the first column) of all possible $W_S$ (which are predetermined and locally stored). As can be seen, the extraction module $207.i$ (described above with reference to the multi-reference signal embodiment) is not needed to detect which precoding matrix W is signified by the single precoded reference signal.

Depending on whether the transmitter 210 uses the requested codeword $u_i$ that was fed back as the transmit codeword $e_i$ for a given receiver $201.i$, two scenarios may arise. In the first scenario, if the transmitter 210 does not use the codeword $u_i$ requested by a given receiver $201.i$ and instead uses a different transmit codeword then the receiver $201.i$ searches over all possible $W_S$. In the second scenario, if the transmitter 210 uses the codeword $i_i$ requested by a given receiver $201.i$ for the transmit codeword then the receiver $201.i$ searches over only the $W_S$ for which X contains $u_i=c_i$. By reducing the number of candidate codewords W that are searched, the codeword estimation process and complexity may be reduced. In accordance with selected embodiments, the search space may be further reduced by eliminating one or more highly improbable combinations.

In an example implementation, the receiver $201.i$ extracts the precoding matrix W from the precoded reference signal by selecting the W corresponding to the predetermined column vector $w_t$ which minimizes the statistical test:

$$z_{test}=\|y-H^H w_t\|^2, w_t \text{ in } W_S(:,1), \quad [10]$$

where y is the received precoded reference signal (e.g., y=$RS_1 w_1 H$), H is the MIMO downlink channel matrix, and $W_S(:,1)$ is the space of the first columns of all $W_S$ (though it will be appreciated that the second column could instead be used, or the third, or any predetermined column). Thus, the selected precoding matrix W is the estimate of the transmit beamforming matrix used by the transmitter 210, and is used by the MMSE receiver $209.i$ in the receiver $201.i$ to design the receive beamforming vectors $v_i$.

In an alternative embodiment for feeding forward transmission matrix information, each of the possible transmission matrices may be associated with a unique vector from a feed forward vector codebook. With such a codebook, the reference signal may be encoded with the vector representative of the transmission matrix used. In that case, the test in Equation [10] is modified to test the reference signal over all possible vector codewords in the feed forward codebook (in lieu of searching over the first columns) with the objective of identifying the codeword used for precoding. Once the codeword is identified, the transmission matrix that it uniquely represents becomes known to the receiver.

To illustrate the potential advantages of the single reference signal embodiment, consider the case of a 4×2 (or a 4×4) multi-user MIMO system in which a codebook $211.i$ of size K is used at each receiver $201.i$ to feed back effective channel codewords u. In this example, the total number of candidate transmit beamforming matrices based on the possible codeword combinations is (K choose 4), meaning that the minimum bit level signaling required to convey the beamforming matrix to the receivers is $\log_2$(K choose 4). As a result, only one precoded pilot symbol is required to determine the beamforming matrix, thereby significantly reducing the control overhead required to convey the precoding matrix information and enabling full MMSE to be performed at the receiver. Of course, selected embodiments contemplate sending more than one reference signal for increased robustness.

Figure 5:
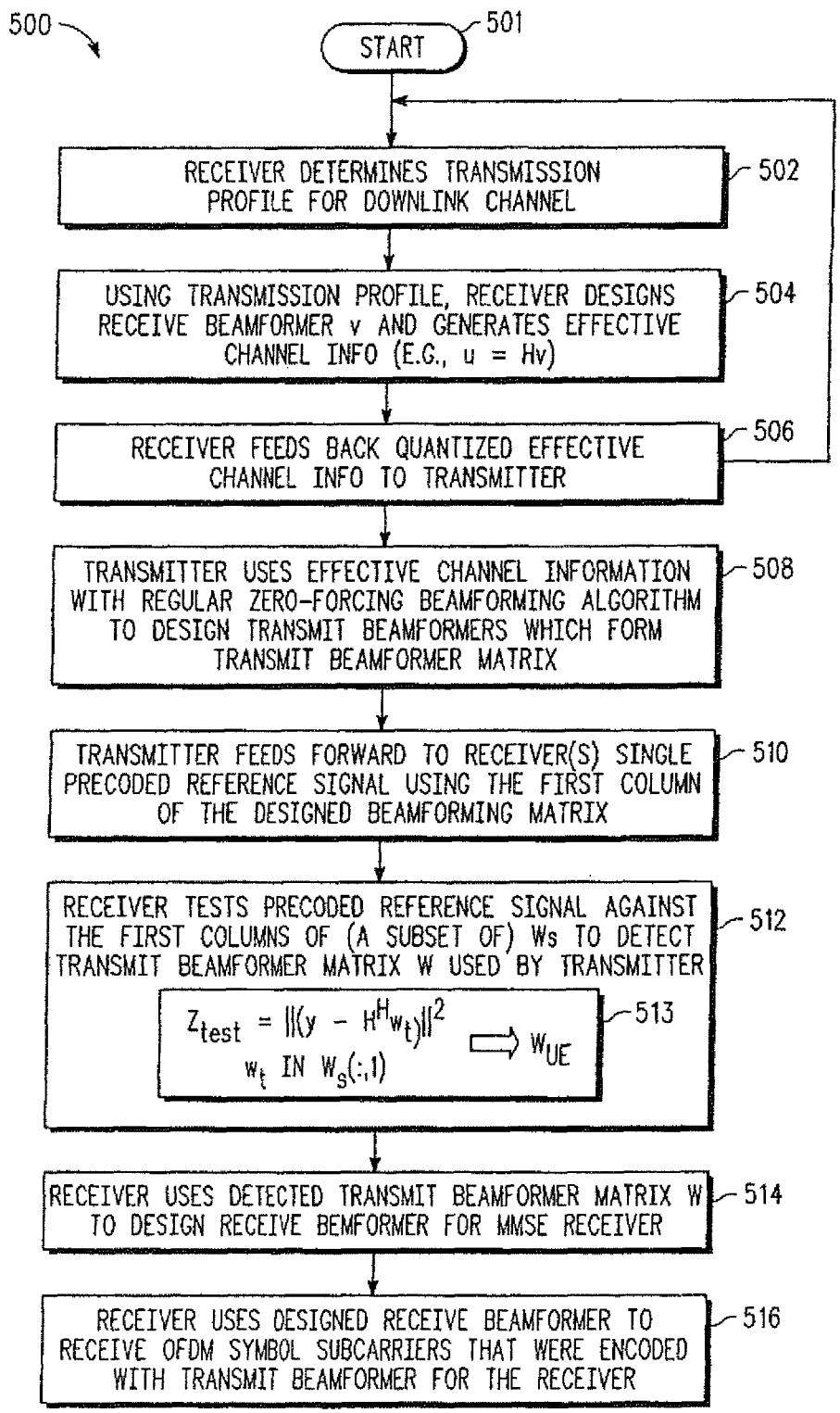
FIG. 5 depicts an example flow for a generalized reference signaling scheme for a multi-user MIMO system using a single precoded reference signal.

In connection with selected single reference signal embodiments of the present invention, FIG. 5 depicts an example flow 500 for a generalized reference signaling scheme for a multi-user MIMO system. As depicted, the process starts (step 501) when the receiver station determines the transmission channel profile based on the estimated channel information for the MIMO transmission channel (step 502). Based on the channel profile information, the receiver station designs its optimal blind receive beamformer v and selects an optimal codeword u=Hv (step 504) to represent the effective channel to the receiver station. In effect, the codeword u is the transmit beamformer w requested by the receiver. In an example implementation, the vectors u and v may be jointly designed by selecting candidate values from a codebook of indexed precoding parameters that maximize a predetermined performance metric for estimating the receive SINR, where the metric is defined to reduce quantization errors resulting from the codebook-based selection process. To account for the fact that the receiver station does not have prior knowledge about potential interference from other receiver stations, the receiver station uses the computed vector v as an initial receive beamforming vector. After quantizing the optimal codeword u (such as by using a codebook of indexed values to retrieve a corresponding index), the indexed effective channel information is then communicated as a feedback signal over the feedback control channel to the transmitter station (step 506) and the receiver repeats the foregoing sequence during the next design cycle (as indicated by the feedback line to step 502).

At the transmitter station, the feedback signals from the receiver stations are decoded to generate effective channel information for each receiver station, and this information is used to design transmit beamformers $w_1, w_2, \ldots w_m$ that will separate the receivers by using a regularized zero-forcing beamforming (R-ZFBF) algorithm (step 508). The designed transmit beamformers, taken together, are a transmit beamforming matrix W. The transmitter then feeds forward to the receivers a single precoded reference or pilot signal that is encoded using the predetermined (first, second, third, etc. . . . )

column of the designed transmit beamforming matrix W (step 510), either directly or using a bit-level signaling scheme.

Upon reception at a receiver, the precoded reference signal is tested to detect the transmit beamforming matrix W that was used by the transmitter (step 512). Each receiver determines the W by hypothesis testing the received precoding reference signal against the predeteremined columns of all possible $W_s$ (or a subset of possible codewords when the transmitter does not change the requested codeword $c_i$ for the receiver). In the depicted example, the test (step 513) that is applied first selects a vector $w_t$ from $W_S(:,1)$ which minimizes the test function $z_{test}=\|y-H^H w_t\|^2$. In this test, y is the received precoded reference signal, H is the MIMO downlink channel matrix, and $W_S(:,1)$ is the space of the predetermined columns of all $W_S$. In an alternative embodiment, a feed forward vector codebook may be used instead of the first column—that is a codebook/set of vectors may be defined such that each transmission matrix is uniquely defined by a distinct vector in the set. The reference signaling may then be done using the codebook vector representative of the transmission matrix used, and the test above may be modified to search over all vector codewords in this codebook. The transmit beamforming matrix W corresponding to the selected vector $w_t$ that minimizes the test function is the receiver's estimate of the beamforming matrix. This estimate of the transmit beamforming matrix W is used by the MMSE receiver 209.i in the receiver 201.i to design the receive beamforming vectors $v_i$. (step 514), and the receiver then uses the designed receive beamformer $v_i$ to receive data that were encoded with transmit beamformer $w_i$ for the receiver (step 516).

Once the transmission matrix W is identified at the receiving device, a second test involves detecting which of the columns of W constitutes the beamforming vector for the receiving device. This information is required to design the MMSE receiver 209.i, and can be obtained by identifying the column that maximizes the metric, $\max_j |w_j^H H v_{opt}|^2$ where H is the channel matrix, and $v_{opt}$ is the optimal blind receive beamformer. The j that maximizes the above function is the column of the transmission matrix that is the beamforming vector intended for itself.

By now it should be appreciated that there has been provided a forward reference signaling method and system for a multiple input, multiple output (MIMO) space division multiple access (SDMA) systems that uses a plurality of precoded reference signals to convey transmit beamforming information. As disclosed, a transmitting device (e.g., a base station) receives effective channel information, such as a preferred precoding vector or information representative thereof, that is fed back from each of a plurality of receiving devices (e.g., user equipment devices). The transmitting device uses the received effective channel information to generate transmit beamforming vectors, such as by using a spatial separation algorithm, such as zero-forcing beamforming, to output transmit beamforming vectors. Transmit beamforming vectors may be generated by selecting transmit beamforming vectors from a defined set of transmit beamforming vectors. The transmit beamforming vectors are used to generate precoded reference signals by using each transmit beamforming vector to encode a reference signal. For example, a first reference signal may be encoded with a first transmit beamforming vector to generate a first precoded reference signal that is designed for a first receiving device, and a second reference signal may be encoded with a second transmit beamforming vector to generate a second precoded reference signal that is designed for a second receiving device. The precoded reference signals may then be fed forward to a plurality of receiving devices where the precoded reference signals are received and used in generating receive beamforming vectors at each receiving device, where each receiving device extracts the plurality of transmit beamforming vectors from the precoded reference signals and identifies which transmit beamforming vector is designed for said receiving device without requiring additional information to be fed forward that identifies the transmit beamforming vector or precoded reference signal that is designed for said receiving device. The extraction may be implemented by applying a first test to the precoded reference signals received at a receiving device to identify which transmit beamforming vector is designed for said receiving device, where the first test selects a reference signal from a finite set of transmit reference signals $y_j$ which maximizes a first projection measure $|v_{opt}^H y_j|^2$ and where $v_{opt}$ is an optimal blind receive beamforming vector initially designed by said receiving device, $y_j$ are the precoded reference signals. In addition or in the alternative, the extraction may be implemented by applying a second test to the precoded reference signals received at a receiving device to identify the plurality of transmit beamforming vectors generated by the transmitting device, where the second test selects, for each precoded reference signal, a transmit beamforming vector from a finite set of transmit beamforming vectors $w_i$ which minimizes a second distance measure $\|y-H^H w_i\|^2$, where y is a precoded reference signal and H is a channel matrix to said receiving device. With the second test, the plurality of transmit beamforming vectors are extracted by selecting transmit beamforming vectors from a defined set of transmit beamforming vectors. After feeding forward the precoded reference signals, the transmitting device may use the transmit beamforming vectors as weighting vectors for signals transmitted by the transmitting device to the at least one of the plurality of receiving device. Thus, a reference signaling framework and methodology are disclosed for feeding forward references signals representing transmission matrix information formed with an arbitrary algorithm that maps codewords fed back by the users to the actual transmission matrix, where the reference signals are generated using N precoded pilots which are formed using N transmission vectors selected from an arbitrary set of vectors unknown to the receiving device. For example, when the N precoded pilots or reference signals are formed by encoding N reference signals using the transmission vectors to the N users, the N reference signals are tested at each receiving device in order to infer which of the N reference signals is meant for the receiving device in question. Once detected, the receiver uses the N reference signals and the reference signal designed for the receiver to design the receiver beamformer.

In another embodiment, there is provided a forward reference signaling method and system for a MIMO SDMA system that uses a minimum of one precoded reference signal to convey transmit beamforming information. As disclosed, a transmitter receives effective channel information, such as preferred precoding vector or information representative thereof, that is fed back from a plurality of receiving devices, and then uses a spatial separation algorithm, such as zero-forcing beamforming, to design a transmit beamforming matrix based on the received effective channel information, where the designed transmit beamforming matrix is selected from a defined set of transmit beamforming matrices. While any type of zero-forcing beamforming may be used, in an example embodiment, a transmit beamforming matrix may be designed by designing a beamforming matrix W using $(X=[c_1\ c_2\ \ldots\ c_m])$, $W=X[X^H X+\alpha I]^{-1}$, where $c_1, c_2, \ldots c_m$ are candidate transmit beamforming vectors received from 'm' receiving devices, α is a smoothing function constant and I is an identity matrix. The designed transmit beamforming matrix is used to generate one or more precoded reference signals by using all or part of the designed transmit beamforming matrix to encode one or more reference signals. For a first example, a precoded reference signal may be generated by encoding a first reference pilot with a predetermined column of the transmit beamforming matrix. In this case, the receiver can apply a hypothesis test to the received precoded reference signal to extract the transmit beamforming matrix by selecting a transmit beamforming matrix from a finite set of candidate transmit beamforming matrices, where the selected transmit beamforming matrix has a predetermined column $w_t$ which minimizes a distance measure $z_{test} = \|y - H^H w_t\|^2$, where y is the received precoded reference signal, and H is a MIMO downlink channel matrix to said receiving device. For a second example, a precoded reference signal may be generated by encoding a first reference pilot with a first vector b selected from a predetermined set of vectors, where each vector in the predetermined set of vectors uniquely represents a candidate transmit beamforming matrix. In the second example, each transmit beamforming matrix may be constructed as a plurality of columns arranged in a predetermined order that is known to the transmitting device and the plurality of receiving devices. In addition or in the alternative, each transmit beamforming matrix may be uniquely associated with one or more unique identifying vectors from a feedforward vector codebook, where each unique identifying vector is generated with a Grassmanian-type codebook. Alternatively, each unique identifying vector associated with a transmission beamforming matrix may be a predetermined column from the transmission beamforming matrix. However defined, the unique identifying vector which is associated with all or part of the designed transmit beamforming matrix may be used to encode a first reference pilot, thereby generating a precoded reference signal. In this case, the receiver can extract the transmit beamforming matrix by hypothesis testing the received precoded reference signal against a predetermined set of vectors, where each vector in the predetermined set of vectors uniquely represents a candidate transmit beamforming matrix. In an example hypothesis test, the receiver extracts the transmit beamforming matrix by selecting a transmit beamforming matrix from a finite set of candidate transmit beamforming matrices which uniquely corresponds to a vector b which is selected by testing the precoded reference signal to identify which vector b from the predetermined set of vectors minimizes a distance measure $z_{test} = \|y - H^H b_i\|^2$, where y is the received precoded reference signal, H is a MIMO downlink channel matrix to said receiving device, and $b_i$ is the predetermined set of vectors. After the precoded reference signal is generated by the transmitter, it is fed forward to the receiving devices for use in generating receive beamforming vectors at each receiving device, where each receiving device extracts the transmit beamforming matrix from at least the precoded reference signal and identifies a transmit beamforming vector that is designed for said receiving device without requiring additional information to be fed forward that identifies the transmit beamforming vector that is designed for said receiving device. As described herein, the designed transmit beamforming matrix can be extracted by hypothesis testing the received precoded reference signal against all possible candidate transmit beamforming matrices, or alternatively by hypothesis testing the received precoded reference signal against a subset of all possible candidate transmit beamforming matrices when a transmit beamforming vector for the receiving device is determined by the effective channel information fed back to the transmitting device. In addition to extracting the designed transmit beamforming matrix from the precoded reference signal(s), the receiving device also uses the precoded reference signal(s) to identify a column from the designed transmit beamforming matrix that is designed for the receiving device by testing all columns of the generated transmit beamforming matrix, such as by selecting a reference signal from a finite set of transmit reference signals $y_j$ which maximizes a first objective measure $|v_{opt}^H y_j|^2$, where $v_{opt}$ is an optimal blind receive beamforming vector initially designed by said receiving device and $y_j$ are the precoded reference signals. Thus, a single precoded reference signal can be used at the receiving device to extract the designed transmit beamforming matrix. Alternatively, a plurality of precoded reference signals can be used at the receiving device to extract the designed transmit beamforming matrix.

In yet another form, there is provided forward reference signaling method and system for a MIMO SDMA system that uses bit index values to convey transmit beamforming information. As disclosed, a receiving device feeds back to a transmitting device a preferred precoding vector or information representative thereof. Based at least in part on the preferred precoding vector or information representative thereof, the transmitting device generates a transmit beamforming matrix using a spatial separation algorithm, such as zero-forcing beamforming, and them transmits over a feed forward channel one or more index bits representative of the generated transmit beamforming matrix. Using the index bits, the receiving device retrieves the generated transmit beamforming matrix from a finite set of candidate transmit beamforming matrices, and uses the transmit beamforming matrix to generate a receive beamforming vector at the receiving device. In selected embodiments, the transmitting device and receiving device share a feed forward codebook containing the finite set of candidate transmit beamforming matrices. Thus, a reference signaling framework and methodology are disclosed for feeding forward transmission matrix information using bits that are representative of the transmission matrix used. When a receiver receives index bit values over the feed forward channel, the index bit values are evaluated against a candidate set of transmission matrices that are generated as a set of all possible combinations of precoding vectors or codewords, wherein any precoding vector (codeword) could be used for the receiving device independent of its feedback. To reduce the evaluation time and complexity, the receiver can evaluate the index bit values against a candidate set of transmission matrices that are generated as a set of all possible combinations of precoding vectors (codewords) wherein one of the preceding vector (codeword) is fixed to be the one that is fed back by the receiving device. In various embodiments, the candidate set of transmission matrices may be compressed to remove unlikely matrices.

The methods and systems for using precoded reference signals to efficiently providing precoding matrix information to receivers in a wireless, multi-user, multi-input, multiple output (MIMO) SDMA system as shown and described herein may be implemented in whole or in part with software stored on a computer-readable medium and executed as a computer program on a general purpose or special purpose computer to perform certain tasks. For a hardware implementation, the elements used to perform various signal processing steps at the transmitter (e.g., receiving and decoding quantized channel vector information, designing the transmit beamforming vectors, generating precoded reference signals, selecting a feedforward index, preconditioning the precoded signals, coding and modulating the data, precoding the modulated signals, and so on) and/or at the receiver (e.g., recovering the transmitted signals, estimating channel information, feeding back quantized channel vector information, demodulating and decoding the recovered signals, receiving and decoding quantized preceded reference signal information, extracting precoding information from the preceded reference signals, designing the receive beamforming vectors, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various multi-user MIMO systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A base station configured for use in a multiple input, multiple output (MIMO) space division multiple access (SDMA) wireless communications network, the base station comprising:
   a transceiver coupled to a plurality of antennas, the transceiver configured to receive channel information from a plurality of remote wireless devices; and
   a processing apparatus in communication with the transceiver, the processing apparatus configured to:
      generate a plurality of transmit beamforming vectors based on the channel information;
      encode a reference signal into precoded reference signals based on each transmit beamforming vector of the plurality of transmit beamforming vectors; and
      feed forward, via the transceiver, the precoded reference signals to the plurality of remote wireless devices, where the precoded reference signals are used to generate receive beamforming vectors at each of the plurality of remote wireless devices;
   wherein the precoded reference signals enable channel determination by at least one of the plurality of remote wireless devices, the determination effected without requiring the base station to transmit information related to (i) the plurality of transmit beamforming vectors; and (ii) a precoded reference signal that is designed for said at least one of the plurality of remote wireless devices.

2. The base station of claim 1, where the processing apparatus is further configured to:
   encode a first reference signal with a first transmit beamforming vector to generate a first precoded reference signal that is designed for the at least one of the plurality of remote wireless devices; and
   encode a second reference signal with a second transmit beamforming vector to generate a second precoded reference signal that is designed for at least one other of the plurality of remote wireless devices.

3. The base station of claim 1, where the processing apparatus is configured to encode a first reference pilot with a predetermined one of the plurality of transmit beamforming vectors.

4. A wireless communication apparatus comprising:
   first apparatus configured to provide, to a network entity, channel information configured to enable the network entity to generate a plurality of transmit beamforming vectors;
   second apparatus configured to receive precoded reference signals that are generated by the network entity based at least in part on the plurality of transmit beamforming vectors; and
   third apparatus configured to identify, based at least in part on the precoded reference signals, a receive beamforming vector of the wireless communication apparatus;
   wherein, the identification is effected without additional information related to a transmit beamforming vector of the plurality of transmit beamforming vectors that is intended for said wireless communication apparatus.

5. The apparatus of claim 4, wherein the first, second, and third apparatus comprise a processing apparatus in communication with a storage device, the storage device comprising at least one computer program configured to, when executed by the processing apparatus, provide the channel information, receive the precoded reference signals, and identify the receive beamforming vector.

6. The apparatus of claim 4, wherein the network entity comprises a multiple input, multiple output (MIMO) space division multiple access (SDMA) base station.

7. The apparatus of claim 4, wherein the network entity comprises at least two antennas.

8. The apparatus of claim 4, where identification of the receive beamforming vector comprises:
   extraction of, at the wireless communication apparatus, the plurality of transmit beamforming vectors from the precoded reference signals; and
   use of the plurality of transmit beamforming vectors to generate the receive beamforming vector at the wireless communication apparatus.

9. The apparatus of claim 4, wherein the apparatus is further configured to apply a first test to the precoded reference signals received to identify which transmit beamforming vector is designed for said wireless communication apparatus, where the first test comprises selection of a reference signal from a finite set of transmit reference signals $y_j$ which maximizes a first objective measure $|v_{opt}^H y_j|^2$, where $v_{opt}$ is an optimal blind receive beamforming vector initially designed by said wireless communication apparatus and $y_j$ are the precoded reference signals.

10. The apparatus of claim 4, where the provided channel information comprises a preferred precoding vector from the wireless communication apparatus.

11. The apparatus of claim 8, wherein extraction of the plurality of transmit beamforming vectors from the precoded reference signals comprises performance of at least one hypothesis test of the precoded reference signals received at the wireless communication apparatus against a predetermined set of vectors, where each vector in the predetermined set of vectors uniquely represents a candidate transmit beamforming matrix.

12. The apparatus of claim 9, wherein the apparatus is further configured to apply a second test to the precoded reference signals received at the wireless communication apparatus to identify each of the plurality of transmit beamforming vectors generated by the network entity, where the second test comprises selection from the precoded reference signals of a transmit beamforming vector from a finite set of transmit beamforming vectors $w_i$ which minimizes a distance measure $\|y - H^H w_i\|^2$, where y are the precoded reference signals and H is a channel matrix to said wireless communication apparatus.

13. The apparatus of claim 11, wherein extraction of the plurality of transmit beamforming vectors comprises selection of a transmit beamforming matrix from a defined set of transmit beamforming matrices.

14. The apparatus of claim 13, further comprising apparatus configured to identify, at the wireless communication apparatus, a column from the selected transmit beamforming matrix, where the identified column is designed for the wireless communication apparatus based on one or more tests that correspond to columns of the transmit beamforming matrix.

15. A method of operating a base station of a multiple input, multiple output (MIMO) space division multiple access (SDMA) wireless communications network, the network configured to communicate with a plurality of mobile devices, the method comprising:
receiving at the base station channel information from at least one mobile device;
generating a plurality of transmit beamforming vectors based on the channel information;
generating at least one precoded reference signal by using at least one transmit beamforming vector of the plurality of transmit beamforming vectors to encode at least one reference signal;
where the at least one precoded reference signal is configured to enable:
generation of receive beamforming vectors by said at least one mobile device;
identification a corresponding channel vector for said at least one mobile device; said identification effected without the base station providing additional information that identifies the at least one transmit beamforming vector or the at least one precoded reference signal corresponding to said at least one mobile device; and
feeding forward the at least one precoded reference signal to the at least one mobile device.

16. The method of claim 15, wherein said generating said at least one precoded reference signal comprises:
encoding said at least one reference signal with said at least one transmit beamforming vector to generate said at least one precoded reference signal configured for use by said at least one mobile device; and
encoding at least one other reference signal with at least one other transmit beamforming vector of the plurality of transmit beamforming vectors to generate at least one other precoded reference signal configured for at least one other mobile device of the plurality of mobile devices.

17. The method of claim 15, wherein said generating said at least one precoded reference signals comprises encoding a first reference pilot with said least one transmit beamforming vector, said least one transmit beamforming vector selected from a predetermined set of the plurality of transmit beamforming vectors.

18. The method of claim 15, where generating the plurality of transmit beamforming vectors comprises using a spatial separation algorithm configured to select a transmit beamforming matrix W using ($X = [c_1 \; c_2 \ldots c_m]$), $W = X[X^H X + \alpha I]^{-1}$;
wherein:
vectors $c_1, c_2, \ldots c_m$ comprise candidate transmit beamforming vectors received from 'm' mobile devices of said plurality of mobile devices;
a parameter $\alpha$ comprises a smoothing function constant; and
matrix I comprises an identity matrix.

19. A multiple input multiple output (MIMO) space division multiple access (SDMA) wireless communications apparatus operable in a wireless communications network, the wireless communications apparatus comprising:
at least one antenna;
a transceiver operably coupled to the at least one antenna; and
processing apparatus in communication with the transceiver, the processing apparatus configured to:
determine channel information related to wireless communication channel between the at least one antennas and a receiver device;
transmit via the at least one antenna the channel information;
receive via the at least one antenna at least one precoded reference signal, the at least one precoded reference signal having been generated using a transmit beamforming vector, the transmit beamforming vector having been generated using the channel information; and
determine by the processing apparatus at least one beamforming vector based at least in part on the received at least one precoded reference signal.

20. The apparatus of claim 19, wherein the determination of channel information is effected by the processing apparatus without receipt of additional information configured to identify any of (i) the transmit beamforming vector; and (ii) the precoded reference signal.

21. The apparatus of claim 19, where the processing apparatus is further configured to:
extract the plurality of transmit beamforming vectors from the precoded reference signals; and
generate at least one receive beamforming vector based at least in part on the plurality of transmit beamforming vectors.

22. The apparatus of claim 19, where the processing apparatus is further configured to:
apply a first test to the precoded reference signals to identify at least one transmit beamforming vector of the plurality of transmit beamforming vectors that is configured for the wireless communications apparatus; and wherein:
the first test comprises selection of a reference signal from a finite set of transmit reference signals $y_j$ which maximizes a first objective measure $|v_{opt}^H y_j|^2$, where $v_{opt}$ comprises an optimal blind receive beamforming vector, initially configured by the wireless communications apparatus, and $y_j$ are the precoded reference signals.

23. The apparatus of claim 19, wherein the channel information comprises a preferred precoding vector.

24. The apparatus of claim 19, wherein
the channel information is transmitted by the apparatus to the receiver device; and
the at least one precoded reference signal is received from the receiver device.

25. The apparatus of claim 21, wherein the extraction of the plurality of transmit beamforming vectors comprises a determination of a selected transmit beamforming matrix from a defined set of transmit beamforming matrices.

* * * * *